United States Patent [19]

Mui

[11] Patent Number: 4,694,467
[45] Date of Patent: Sep. 15, 1987

[54] MODEM FOR USE IN MULTIPATH COMMUNICATION SYSTEMS

[75] Inventor: Shou Y. Mui, Cherry Hill, N.J.

[73] Assignee: Signatron, Inc., Lexington, Mass.

[21] Appl. No.: 881,611

[22] Filed: Jul. 3, 1986

[51] Int. Cl.[4] .............................................. H04B 7/00
[52] U.S. Cl. ......................................... 375/1; 380/34; 380/42
[58] Field of Search ................. 375/1, 58, 96; 371/37; 380/28, 33, 34, 35, 48, 32, 42, 43

[56] References Cited

U.S. PATENT DOCUMENTS 4,351,064  9/1982  Ewanus .................................. 380/34
4,454,604  6/1984  Myers .................................... 375/1
4,606,040  8/1986  David et al. ......................... 380/34

Primary Examiner—Benedict V. Safourek
Attorney, Agent, or Firm—Robert F. O'Connell

[57] ABSTRACT

A modem in which the transmitter uses spectrum spreading techniques applied to sequentially supplied input bits, a first group thereof having one spread spectrum sequence characteristic and a second group thereof having a different spread spectrum sequence characteristic, the spread spectrum bits being modulated and transmitted. The receiver generates complex samples of the received modulated signal at a baseband frequency and uses a detector for providing signal samples of the complex samples which are time delayed relative to each other. A selected number of the time delayed samples are de-spread and demodulated and the de-spread and demodulated samples are then combined to form a demodulated receiver output signal.

12 Claims, 3 Drawing Figures

MODEM FOR USE IN MULTIPATH COMMUNICATION SYSTEMS

FIELD OF THE INVENTION

The field of the invention is the field of communication systems and modems for use therein.

INTRODUCTION

This invention relates generally to transmitter/receiver modems and, more particularly, to a novel design systems in which the effects of multipath fading are reduced.

BACKGROUND OF THE INVENTION

High frequency (HF) communication systems for example, exhibit multipath signal delay spread characteristics that can cause intersymbol interference (ISI) and, hence, multipath fading at a receiver thereof, resulting in a severe degradation in the performance of such communication systems. Several techniques have been employed to combat such multipath fading, namely, the use of parallel tone transmission techniques, the use of serial tone transmission techniques, or the use of adaptive equalization techniques.

In the parallel tone technique, the modem simultaneously sends a number of waveforms at different subcarrier frequencies in order to provide longer symbols and thereby make the delay spread only a small fraction of the symbol duration in order to reduce ISI. Typical of this technique is the so-called "Kathryn" modem, developed by General Atronics Corporation and described in the article, "The AN/GSC-10 (Kathryn) Variable Rate Data Modem for HF Radio", IEEE Transactions on Communicaton Technology, Volume COM-15, No. 2, April 1967, pp. 197–204. The Kathryn modem is relatively simple but has difficulty in combatting multipath fading and, further, is sensitive to frequency error due to the long symbol duration. Such parallel tone modems also suffer from the effects of peak-to-average signal loss since the radio transmitter must operate with a sufficient back-off of the transmitter amplifier to accommodate the voltage variations in the sum of the subcarriers.

Examples of adaptive equalization techniques are discussed in the article "Feedback Equalization for Fading Dispersive Channels", by P. Monsen, IEEE Trans. on Information Theory, Vol. IT-17, No. 1, January 1971, pp. 56–64, and in U.S. Pat. Nos. 3,879,664 and 4,328,585 issued to P. Monsen on Apr. 22, 1975 and May 4, 1982, respectively. In such an approach, the modem employs adaptive techniques to track the amplitude and phase of each multipath return signal to combine the energies in the various paths (e.g., by matched filtering) and/or to remove ISI (e.g., an equalization technique). One or more transversal, or tapped delay line (TDL), filters are usually employed for these functions. This type of modem is quite complex in its configuration and operation and, while it works well under slow fading conditions, it tends to have difficulties in tracking under fast fading conditions. The complexity and the tracking difficulty are due to the fact that both the phase and amplitude of the tap weights are adapted and that the number of taps required is relatively large.

A serial tone technique is discussed in the article "HF ACARS[SM] Signal In Space Specification," published by Aeronautical Radio, Inc. (ARINC), ARINC Document No. SE-84012, dated Mar. 12, 1984. In the system of the type discussed in the article, the modem is designed for data transmission at 300 bits per second (bps) and uses error-correction encoding to reduce the signal-to-noise ratio required to support reliable operation. The modelm transmits a preamble signal and encoded information bits, each bit being band spread by applying a seven bit Barker sequence to each bit. The receiver uses the preamble signal to acquire the frequency of the transmitted signal, the MSK chip period (where the transmitter uses MSK modulation) and the transmitter bit symbol perod and then demodulates the encoded signal and decodes the demodulated signal. Such an approach is not as effective as desired since the use of the specified Barker sequence does not appear to provide a good band spreading characteristic. Further the format of the encoded information proposed therein does not appear to be very effective. As a result, the modem does not respond to enough multipath signals to provide the desired operation, does not provide adequate resolution over the desired range of Doppler shifts, and tends to produce undesirable sidelobe properties in the modem signal.

It is desirable, therefore, to overcome the disadvantages of the above systems and to provide an improved serial tone modem using non-equalization techniques.

BRIEF SUMMARY OF THE INVENTION

A modem in accordance with the invention employs serial tone transmission with spectrum spreading using at least two low cross-correlation sequences in conjunction with multiple-symbol detection in order to minimize the ISI, thereby eliminating the need for the use of adaptive equalization technique and considerably reducing the complexity of the modem configuration and operation as compared with the above discussed, adaptive systems. The time delay spreads of the multipath return signals are measured during initial acquisition thereof by the receiver. In one embodiment thereof, for example, a tapped delay line (TDL) filter having a relatively large number of taps is used. At any one time only a selected, and relatively small, number of such taps are used during the processing of the received signal, the number being selected to reduce the processing time and the complexity of the circuitry needed for such processing. The TDL filter employs time delays matching the measured delay spread profile to combine the signal energies in the multipaths. The combining of the selected tap outputs is noncoherent in nature as there is no need to track the relative phases of the multipath signals. With such a technique the modem provides reliable communications under fast, as well as under slow, facing conditions and is a simpler technique to implement than is required in modems employing adaptive equalization or employing a large number of taps.

The modem of the invention can further utilize data interleaving and error correction encoding in order to further mitigate the effects of channel fading and, thus, further improve the modem performance, although the use of such processing is not absolutely necessary in some applications. Unlike the above discussed serial tone, non-adaptive technique, the signal spreading technique of the invention uses different sequences for different bit groups of the transmitted signal and a multiple bit detection operation in the receiver rather than the conventional single bit detection operation normally used in such modem systems.

The modem of the invention finds particularly effective use in a burst communication modem system, i.e., one in which relatively short messages (generally less than about 10 seconds or so) are sent. Each message is preceed by a known preamble signal to allow modem signal acquisition, the acquisition process including the measurement of the relative time delays of the multipath signals.

DESCRIPTION OF THE INVENTION

The invention can be described with the help of the accompanying drawings wherein.

Figure 1:
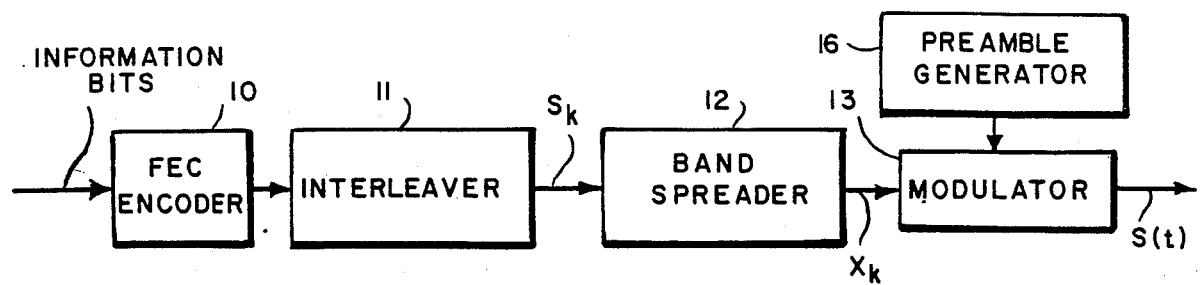
FIG. 1 shows a block diagram of a transmitter portion of a modem of the invention.

The transmitter portion of the modem of the invention is shown by itself in the broad block diagram of FIG. 1. Information bits which are to be transmitted are supplied to a forward error correction (FEC) encoder 10 which adds redundancy to the information sequence for correcting noise-induced errors. Such proces is well understood by those in the art as described, for example, in the article "A Robust HF Modem" by Shou Y. Mui et al., 1985 IEEE Military Communications Conference, Boston, Mass., Oct. 20–23, 1985, Vol. 1, pages 266–270.

The redundant encoded bits are then supplied to an interleaver circuit 11 which re-arranges the order of the bits for the purpose of breaking up bursts of error in order to improve the effectiveness of the FEC encoder. The use of such interleaving is also well-known to the art as discussed in Mui et al. While the use of such encoding and interleaving processes are normally desirable for use in a modem system of the invention, in some applications they are not essential for the technique of invention to be used, although normally their use will improve the performance of the modem. The output bits from the interleaver circuit are denoted by $S_k$, where $k = 0, 1, 2, \ldots$ etc., the values of each $S_k$ bit being either $+1$ or $-1$.

The high-frequency modem of the invention in a particular embodiment, for example, can support a data rate of up to 300 bits-per-second (bps). The FEC encoding rate can be selected as $\frac{3}{4}$ so that the encoded symbol rate of $S_k$ is 400 bps.

The interleaver circuit output bits $S_k$ are applied to a band (spectrum) spreader circuit 12 which multiplies each $S_k$ bit by a spreading sequence consisting of n symbols, where n is odd and equal to or greater than two, and whose durations is 1/n times as long as the $S_k$ symbols. These spreading symbols are often called "chips" by those in the art and also have $\pm 1$ values. The spreading sequence of n chips can be selected to be different for different groups of bits. For example, the spreading sequence can be allowed to differ for successive odd and even interleaved bits so that the odd bits are spread in accordance with one sequence and the even bits are spread in accordance with a different sequence.

In a particular embodiment, for example, in a 300 bps modem, the band spreader circuit 12 employs two 5-chip spreading sequences (i.e., n=5). The spreading sequences, A and B, for example, are $A = (+1, +1, +1, -1, -1)$ and $B = (+1, -1, +1, -1, +1)$. The band spreader output is $S_0A, S_1B, S_2A, S_3B, S_4A \ldots$, and so on. In such case, $S_k A = (S_k, S_k, S_k, -S_k, -S_k)$ and $S_k B = (S_k, -S_k, S_k, -S_k, S_k)$. The spreading sequences are chosen so that the correlation of the transmitted sequence with offsets of the same sequence is small. It should be noted that the correlation generally depends on the modulation and demodulation techniques which are employed.

In general, the length n of sequences is determined by the data rate and channel bandwidth. More specifically, if the encoded bit rate is R and the channel bit rate, as determined by the available channel bandwidth and the bandwidth efficiency of the modulation technique, is not to exceed a value $R_c$, then n is equal to the greatest integer not exceeding $R_c/R$. Thus, for a 300 bps modem, for example, which employs a 3/4 encoding rate and operation over nominal 3.0 kHz HF channel, $R = 400$ bps, $R_c = 2000$ bps and, hence, $n = 5$. In such a case it is found that a channel signaling rate higher than 2000 bps will result in significant losses in signal-to-noise ratio due to band limiting. In general, the use of longer spreading sequences, i.e., a larger value of n, results in smaller correlations between the two offset sequences. Therefore, a system employing long spreading sequences will tend to have less ISI due to multipath fading than a system employing short spreading sequences.

Although the above example discusses the use of two spreading sequences A and B, the technique is applicable to any number of spreading sequences, the number of spreading sequences employed depending on the maximum delay spread to be handled by the modem. In particular, if $T_S$ is defined as the time duration of each spreading sequence and the maximum separation of the multipath returns is defined as $T_M$, then the number of spreading sequences is equal to the smallest integer that is greater than or equal to $T_M/T_S$. For HF applications, for example, $T_M$ is usually less than 5.0 milliseconds (ms). With $R_c$ selected as 2000 bps (or alternatively as 2000 chips. sec after the spreading sequence has been applied) and n=chips, $T_S = 2.5$ ms. Therefore, two spreading sequences are employed in a 300 bps HF modem as described above.

The band spreader output bits will be denoted by $x_k$, where $k = 0, 1, 2, \ldots$, etc. The values of $x_k$ are $+1$ and $-1$. In the above example in which two spreading sequences are used, $x_0 = S_0, x_1 = S_0, x_2 = S_0, x_3 = -S_0, x_4 = -S_0, x_5 = S_1, x_6 = -S_1, \ldots$, and so on.

The output bits from band spreader circuit 12 are supplied to a modulator 13, the modulation used preferably being a well-known minimum shift keying (MSK) type of modulation, which modulation, as shown, is a special case of continuous phase frequency shift keying (CPFSK) with a modulation index of 0.5. Such MSK modulation is generaly looked upon as being a bandwidth-efficient type of modulaton and, hence, useful in this application. The modulator output may be expressed as s(t) where:

$$s(t) = A_m \cos [2\pi f_c t + \phi(t)] \qquad (1)$$

where $A_m$ is the peak signal amplitude, $f_c$ is the carrier frequency and $\phi(t)$ is the phase term which carries the information. More specifically, the phase for the $k^{th}$ signaling interval is $$\phi(t) = \phi(kT) + x_k \frac{\pi}{2T} (t - kT); kT < T < (k + 1)T \quad (2)$$

and $\phi(0)$ is an arbitrary starting phase and T is the chip duration. For the case of a 300 bps modem with rate 3/4 coding and an n=5 spreading sequence, T=0.5 ms. In understanding the invention, it is convenient to represent the transmitted signal as $$s(t) = A_m Re\{\tilde{s}(t)e^{j2\pi f_c t}\} \quad (3)$$

where $$\tilde{s}(t) = e^{j\phi(t)} \quad (4)$$

is the complex envelope process, j is the square root of −1 and "Re" stands for the "real part of".

In summary, with reference to FIG. 1, in accordance with the above discussion, it is well within the skill of those in the art to design specific circuitry for performing the encoding, interleaving, band spreading and modulator operations heretofore discussed.

Figure 2:
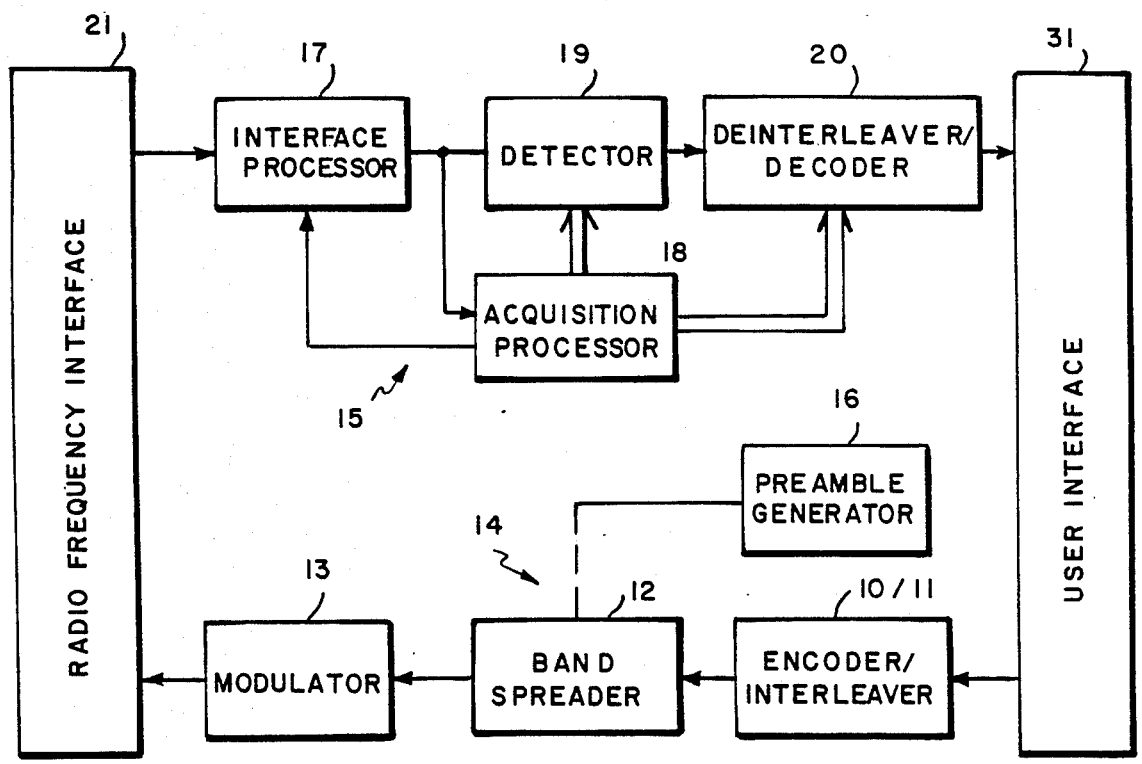
FIG. 2 shows a block diagram of an overall modem of the invention depicting both the transmitter and receiver portions thereof.

A block diagram of an overall modem in accordance with the inventon showing the interfaces and the transmitter and receiver portions 14 and 15, respectively, of the modem is depicted in FIG. 2. In the transmitter portion 14 a preamble generator 16 supplies a suitable, known, preamble signal at a time preceding the supplying of signal information bits in order to allow the receiver portion of the modem to synchronize the frequency and timing of the receiver system with the transmitter system and to determine the location in time of the multipath signals.

The preamble signal, for example, in a preferred embodiment can be of the type discussed in the above article of Mui et al. and is made up of two continuous wave (CW) tones af the frequencies 2000 Hz and 1000 Hz, and such tones being alternately transmitted for an interval of 250.5 ms. The tone switches from one frequency to the other once every 1.5 ms. The CW preamble is used to detect the presence of the signal and to measure the Doppler offset of the received signal.

The CW portion of the preamble signal is followed by a "chip frame pattern" of 225 ms. The chip frame pattern is used to achieve bit timing synchronization, receiver adaptation, and channel measurement.

The preamble ends with a 24-bit unique word (UW) which is used to synchronize the de-interleaver and decoder. During this UW transmission, the encoder and interleaver are not used. Transmission of the UW takes 60 ms.

The receiver portion 15 of the modem comprises an interface processor 17, an acquisition processor 18, a detector 19 and de-interleaver/decoder circuitry 20. The interface processor 17 samples the audio signal received from the HF radio frequency (r-f) interface circuitry 21 and employs well-known Hilbert transform techniques for generating complex baseband signal samples. The interface processor also includes circuitry for compensating for any frequency offsets of the received signal from the desired frequencies. The design of processor 17 would be well within the skill of the art. Two complex samples are generated for each MSK chip.

The acquisition processor 18 responds to the preamble signal by using well-known fast Fourier transform techniques to estimate the frequency offsets beteen the two CW tones in the received preamble signal and the desired frequencies thereof as transmitted. The acquisition processor supplies the frequency offset estimates to the interface processor which responds to the frequency offset estimates and, using well-known quantized feedback shift techniques, shifts the frequencies of the baseboard signal samples of the received signal by such estimates so as to minimize the frequency offsets of the received signal samples.

The acquisition processor 18 is also used to determine the relative time delays of the multipath return signals and to provide bit synchronization for the detector 19. To measure the relative multipath signal delays, the acquisition processor 18 correlates the received baseband signal samples with a copy of the received preamble signal so as to determine in a particular embodiment, for example, the four largest multipath signal values and thereby to locate their relative positions in time. Thus, the peaks of the correlation identify the relative time delays of the four largest multipath signals. The determination of such relative time delays represents the desired multipath time profile, such information being supplied from the acquisition processor to detector 19 for the purpose of initializing the correct positioning of the taps of the tapped delay line thereof to conform to the positions of the relative time delays of such four largest bath values.

The detector 19 tracks the amplitude of the multipath signal returns and demodulates the received signal, as described in detail below. The de-interleaver puts the bits back into the correct order and the decoder provides an estimate of the transmitted information sequence. The designs for the acquisition processor, de-interleaver and decoder circuits would be well-known to those in the art for performing the aforesaid operations.

Figure 3:
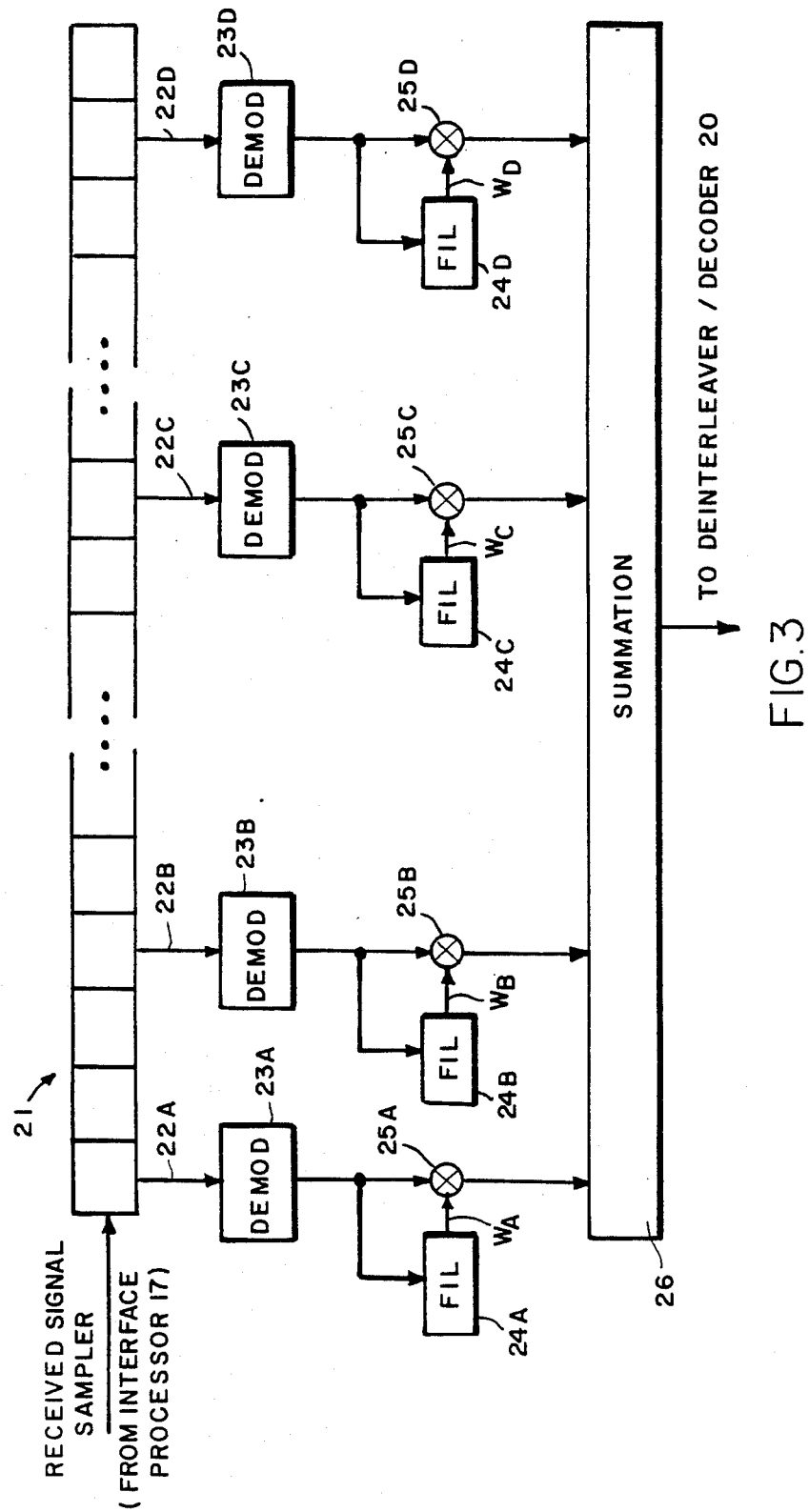
FIG. 3 shows a block diagram of a detector used in the receiver portion of the modem shown in FIG. 2.

A block diagram of the detector 19 is shown in FIG. 3. The detector receives samples of the received signal from interface processor 17 and employs a TDL filter. Such filter is in the nature of a "rake" filter, such filters being generally described, for example, in the article "A Communication Technique for Multipath Channels", by R. Price and P. E. Green, Jr., Proc. IRE, Vol. 46, March 1958, pp. 555–570. For effective detection operation, the length of the TDL filter normally need only be equal to the multipath spread of the channel. For ease of acquisition, however, it is preferably made equal to the total duration of the spreading sequences. In particular, if m spreading sequences, each of time duration $T_S$, are used, the TDL is $mT_S$ seconds long. For a 300 bps modem, the length of the TDL is 5 ms.

A rake filter can have a relatively large number of taps but all of the taps thereof need not be activated for use in the operation of the invention. For example, FIG. 3 shows an exemplary detector using a plurality of shift registers 21 forming in effect a tapped delay line having a plurality of activated taps, 22A through 22D. The number of taps required is equal to a selected number of multipath components desired to be processed, e.g., in an exemplary embodiment, as discused above, four taps are used. In the context of a practical HF radio modem, the number may range from one up to six, depending on propagation conditions and on the operating frequency. The cost of the implementation depends on the number of taps used. Accordingly, the ability to select only a minimum number of taps allows the modem to be built at minimum cost.

In the particular embodiment shown, the positioning of the taps is selected so that the separations between the selected taps are equal to the multipath delay spreads of the four multipath signals having the largest correlated peak path values measured during acquisition as discussed above. Once the relative time positions of such peaks are known the taps of the TDL can be positioned accordingly to correspond thereto. In order to avoid positioning a selected tap at a correlation side lobe, rather than at a correlation pek, the selected taps are positioned so as to have a minimum tap spacing therebetween such that there are no selected tap positions directly adjacent each other, i.e., there is at least one non-selected tap position between any two selected tap positions.

Each tap is associated with a demodulator (i.e., demodulators 23A through 23D) which de-spreads and then demodulates the signal in a manner well known to the art. The demodulated outputs are each multiplied by a tap weight $W_A$ through $W_D$, respectively, using filter circuits 24A through 24D, as shown. The product outputs from multipliers 25A-25D are combined by summing them in summation circuit 26. The output of circuit 26 is supplied to the de-interleaver/decoder circuitry 20.

The demodulator preferably employs multiple-bit detection (e.g., 3 or 5-bit detection), or demodulation, of the type described, for example, in the article by W. P. Osborne and M. B. Luntz, "Coherent and Noncoherent Detection of CPFSK," IEEE Transactions on Communications, Augst 1974, pp. 1023-1036. The basic demodulation scheme thereof is to use the received signal for the past bit(s) and the future bit(s) in order to aid in the demodulation of the current bit. In order to best understand the demodulation process, consider the 3-bit case, for which one lets z (a, b, c) be a vector of 30 complex samples obtained by sampling the complex envelope s(t) corresponding to a transmitted 3-bit long pattern (a, b, c). The sampling is 2 samples per chip and there are 5 chips in each bit. The phase (t) is assumed to be zero at the beginning of bit "a". Similarly, let r be the received vector with 30 complex samples supplied by the interface processor 17. Finally, let r·z* (a, 1, c) represent the complex correlation of r with the complex conjugate of z(a, b, c). The demodulator computes the magnitudes of r·z* (a, −1, c), for (a, c)=(+1, +1), (+1, −1), (−, +1) and (−1, −1), and then selects the maximum of the four magnitudes, such maximum being denoted by $z_m(1)$. Similarly, the demodulator computes the maximum of the four magnitudes of the correlations r·z* (a, −1, c) for all combinations of a and c, such maximum being $z_m(-1)$. The output of the demodulator is $[z_m(1)-z_m(-1)]$.

The demodulator has to keep track of whether the bit $S_k$ is even or odd numbered so that the appropriate spreading sequence, as discussed with reference to the transmitter of FIG. 1, is used to generate the local reference signal z (a, b, c). The overall demodulation operation can be achieved in software in an appropriate processor, as would be well known to those in the art.

The tap weights are a measure of the short-term average power of the signal at each tap delay. Thus, if $X_i$ represents the output of a demodulator 23 at bit time i, then the weight $W_i$ for the tap can be generated by a first order digital filter 24.

$$W_i = (1-\alpha)W_{i-1} + \alpha X_i^2 \quad (5)$$

where $\alpha < 1$ determines the loop constant. Variations of the tracking loop may be used to tailor the detector to specific fading conditions. For an exemplary 300 bps modem, $\alpha = 0.15$ can be used. $x_i^2$ is a good measure of the instantaneous power of a multipath return signal because the use of low-sidelobe spreading sequences reduces the contributions from other multipath returns significantly.

Such technique is particularly applicable to low data rate communications where the channel bandwidth permits band spreading. The band spreading factor should be at least 5 to ensure that the correlation side lobes are sufficiently small. For a 3.0 kHz high frequency channel, the technique can be applied to a data rate of 300 bps or lower. Prior art adaptive modems are discussed above are used for much higher data rate transmissions, e.g., 1200 or 2400 bps, where little spreading is possible within the channel so that adaptive equalization is necessary to remove the ISI. such technique would be less effective for the lower data rate operations of interest here, i.e., data rates well below the 1200-2400 bps range. Moreover, the modem of the invention operates with very rapid fading and/or relatively large frequency errors, whereas an adaptive equalizer modem or a parallel tone modem would tend to work very poorly.

The 3-bit detector discussed with reference to FIG. 3 provides an enhanced detection operation as compared to the use of a single-bit detector normally used in modems of the prior art.

While the embodiments of the inventionn discussed above are described in the context of a high frequency radio communications system it would be clear to those in the art that the invention can be used in other contexts having similar multipath characteristics. Hence, the invention is not to be construed as limited to the embodiments discussed above except as defined by the appended claims.

What is claimed is:

1. A modem for use in communication systems used for transmitting and receiving information bits, said modem comprising
    a transmitter including
        spectrum spreading means responsive to a plurality of sequentially supplied input information bits for providing a plurality of spread spectrum information bits, a first group thereof having spread spectrum characteristics in accordance with a first spread spectrum sequence and a second group thereof having spread spectrum characteristics in accordance with a second spread spectrum sequence which differs from said first spread spectrum sequence;
        modulation means for modulating said plurality of spread spectrum information bits to provide a modulated transmitter signal;
        means for generating a preamble signal;
        means for sequentially transmitting said preamble signal and said modulated transmitter signal;
    a receiver including
        means for receiving said preamble signal and said modulated transmitter signal;
        processing means including
            means responsive to said preamble signal for processing said preamble signal to provide estimates of the frequency offsets of said received preamble signal;
            means responsive to said modulated receiver signal for generating complex baseband signal samples; and means responsive to said frequency offset estimates and to said complex baseband signal samples for shifting the frequencies of said baseband signal samples by said frequency offset estimates to reduce the frequency offsets of said baseband signal samples to a minimum;

detector means comprising means responsive to sid frequency shifted complex baseband signal samples for providing a plurality of signal samples which are time delayed relative to each other;

means responsive to a selected number of said time delayed signal samples for de-spreading and for demodulating each of said selected signal samples to provide a selected number of de-spread and demodulated signal samples; and means for combining said selected number of de-spread and demodulated signal samples to provide a demodulated received output signal.

2. A modem in accordance with claim 1 wherein the correlation of said first and second spread spectrum sequences is low.

3. A modem in accordance with claim 1 wherein said first group of said information bits are the even numbered bits of said input information bits and said second group of said information bits are the odd numbered bits of said input information bits.

4. A modem in accordance with claim 1 wherein the spread spectrum sequence for said first group is $(+1, +1, +b, -1, -1)$ and the spread spectrum sequence for said second group is $(+1, -1, +1, -1, +1)$.

5. A modem in accordance with claim 1 wherein said detector means identifies each group of information bits and de-spreads and de-modulates each group in accordance with the spread sequences associated therewith.

6. A modem in accordance with claim 1 wherein said signal samples providing mean is a tapped delay line means having a selected number of tap outputs, said selected number of tap outputs being selectively positioned to provide said time delayed signal samples.

7. A modem in accordance with claim 6 wherein said processing means further includes means responsive to said preamble signal and to said baseband signal samples for correlating said preamble signals and said signal samples to determine the relative time delays of a selected number of peak values of said correlation, said tap outputs being selectively placed at relative positions of said tapped delay line means corresponding to the relative time delays of said selected peak values.

8. A modem in accordance with claim 6 and further including means responsive to said selected number of tag outputs for de-spreading and demodulating said selected number of time delayed signal samples; and means responsive to said de-spread and demodulated signal samples for multiplying each said signal samples by a weighted value to provide said weighted de-spread and demodulated signal samples to said combining means.

9. A modem in accordance with claim 8 and further including means for providing a weighted value to said multiplying means for each of said signal samples.

10. A modem in accordance with claim 9 wherein said weighted value providing means determines said weighted values as a measure of the short term average power of the de-spread and demodulated signal samples received from said selected tap outputs.

11. A modem in accordance with claim 9 wherein said weighted value providing means comprises digital filter means responsive to said de-spread and demodulated signal samples for providing the weighted values for each of said multiplying means.

12. A modem in accordance with claim 8 wherein said de-spreading and demodulating means include a multiple-bit non-coherent detection means.

* * * * *